United States Patent
Ham et al.

(10) Patent No.: US 7,446,135 B2
(45) Date of Patent: Nov. 4, 2008

(54) BLOCK COPOLYMERIC DISPERSANT FOR PIGMENT PARTICLE IN AQUEOUS SYSTEM, AND INK COMPOSITION COMPRISING THE SAME

(75) Inventors: Cheol Ham, Yongin-si (KR); Seung-min Ryu, Yonin-si (KR); Su-aa Jung, Suwon-si (KR)

(73) Assignee: Samsung Electroncis Co., Ltd., Suwon-si, Gyeonggi-do (KR)

( * ) Notice: Subject to any disclaimer, the term of this patent is extended or adjusted under 35 U.S.C. 154(b) by 699 days.

(21) Appl. No.: 11/000,922

(22) Filed: Dec. 2, 2004

(65) Prior Publication Data
US 2005/0132931 A1    Jun. 23, 2005

(30) Foreign Application Priority Data
Dec. 23, 2003  (KR)  ............... 10-2003-0095526

(51) Int. Cl.
*C09D 11/00* (2006.01)
(52) U.S. Cl. .................... 523/160; 523/161
(58) Field of Classification Search ............. 523/160, 523/161
See application file for complete search history.

(56) References Cited

U.S. PATENT DOCUMENTS

| | | | | |
|---|---|---|---|---|
| 5,085,698 | A | * | 2/1992 | Ma et al. ............ 524/388 |
| 5,219,945 | A | * | 6/1993 | Dicker et al. ........ 525/276 |
| 5,272,201 | A | * | 12/1993 | Ma et al. ............ 524/505 |
| H1828 | H | * | 1/2000 | Wong et al. ......... 523/161 |
| 6,127,453 | A | * | 10/2000 | Erdtmann et al. ..... 523/160 |
| 6,258,155 | B1 | | 7/2001 | Guistina et al. |
| 6,262,207 | B1 | | 7/2001 | Rao et al. |
| 6,455,628 | B1 | * | 9/2002 | Ma et al. ............ 524/505 |
| 6,877,851 | B2 | * | 4/2005 | Watanabe ........... 347/100 |
| 7,199,177 | B2 | * | 4/2007 | Auschra et al. ...... 524/505 |
| 2003/0144377 | A1 | * | 7/2003 | Sano et al. .......... 523/160 |

FOREIGN PATENT DOCUMENTS

| JP | 7-207178 | 8/1995 |
|---|---|---|
| JP | 6-248210 | 9/2004 |

* cited by examiner

*Primary Examiner*—Edward J Cain
(74) *Attorney, Agent, or Firm*—Roylance, Abrams, Berdo & Goodman, L.L.P.

(57) ABSTRACT

A dispersant having excellent adsorption to hydrophobic particles and an ink composition comprising the dispersant are provided. The dispersant is a block copolymer comprising a hydrophilic moiety and a hydrophobic moiety having a hydrophobic substituent attached to a terminal end of the hydrophobic moiety.

11 Claims, No Drawings

BLOCK COPOLYMERIC DISPERSANT FOR PIGMENT PARTICLE IN AQUEOUS SYSTEM, AND INK COMPOSITION COMPRISING THE SAME

CROSS-REFERENCE TO RELATED APPLICATION

This application claims the priority under 35 U.S.C. § 119 of Korean Patent Application No. 2003-95526, filed on Dec. 23, 2003, in the Korean Intellectual Property Office, the disclosure of which is hereby incorporated by reference in its entirety.

BACKGROUND OF THE INVENTION

1. Field of the Invention

The present invention relates to a polymeric dispersant for hydrophobic particles including pigment particles in an aqueous system, and an ink composition comprising the polymeric dispersant. More particularly, the present invention relates to a polymeric dispersant capable of forming a stable dispersion due to its excellent dispersing properties for hydrophobic particles, and an ink composition comprising the polymeric dispersant.

2. Description of the Related Art

Hydrophobic particles tend to aggregate in an aqueous system when the hydrophobic particles are present in an aqueous medium. A dispersant is added to the aqueous system to decrease the tendency for aggregation of the hydrophobic particles.

A dispersant prevents hydrophobic particles from aggregating or precipitating, helps to break up the hydrophobic particles into small sizes during milling of the particles, and maintains the hydrophobic particles in a stable dispersed state during long-term storage of the aqueous system. A dispersant has both a hydrophobic moiety and a hydrophilic moiety. The hydrophobic moiety has an affinity for the surface of the hydrophobic particles and the hydrophilic moiety is solubilized by water thereby maintaining a stable dispersed state.

When a dispersant is added to an aqueous system, a hydrophilic moiety forms a spatial outer shell around the particles and prevents the particles from aggregating by reinforcing a negative or positive charge on its surface, while a hydrophobic moiety adsorbs a dispersant to the surface of the hydrophobic particles.

Spatial and electrostatic stabilization provided by the hydrophilic moiety occurs by powerful mutual repulsion between individual dispersant/hydrophobic particle composites. Such repulsion results from hydrophilic moieties comprising ionic functional groups. Thus, individual dispersant/hydrophobic particle composites possess effectively high charges. The ionic functional groups can be cationic or anionic, but in general should have the same type of charges. The functional groups with the same charge repel each composite thereby suppressing aggregation of the particles.

On the other hand, stable adsorption of a dispersant is needed for the long-term dispersion stability of hydrophobic particles in an aqueous system, and rapid wetting is needed for cost savings.

Over the last few years, polymeric dispersants have been proposed for use as a dispersant for stabilizing aqueous systems.

International Patent Application PCT/US1999/09145 by 3M Innovative Properties Company discloses a dispersant for dispersing hydrophobic particles in an aqueous system. The dispersant comprises a hydrophobic moiety consisting of a nonpolymerized hydrocarbon moiety linked to at least one terminal polymeric hydrophilic moiety consisting of a polymeric electrolyte. The dispersant is characterized as having a linear or branched aliphatic hydrophobic moiety adsorbed to pigment particles and a water-soluble polymer hydrophilic moiety. The dispersant having this structure does not provide stable adsorption for hydrophobic particles due to lack of hydrophobic moieties. Further, many dispersants are so selective for a pigment that specific dispersants are needed for each pigment type when used in inks.

Further, a copolymeric dispersant consisting of a hydrophobic moiety and a hydrophilic moiety is also used.

The arrangement of monomers in the copolymeric dispersant can be varied according to the preparation methods. For example, there are random copolymers in which different monomers are linked without a constant arrangement, and block copolymers in which a moiety consisting of a monomer and a moiety consisting of another monomer are linked together. The block copolymers possess properties of a single polymer consisting of each monomer in substantial portions.

The random copolymer is a copolymer in which a hydrophobic moiety and a hydrophilic moiety are irregularly incorporated. Thus, since the random copolymer has weak adsorption to the surface of hydrophobic particles, it relies primarily on an electrostatic repulsion to prevent hydrophobic particles from aggregating. Accordingly, a dispersant consisting of a random copolymer cannot ensure long-term storage stability. On the other hand, in a dispersant consisting of a block copolymer, the dispersion ability can be maximized by controlling the size of the hydrophobic moiety and the size of the hydrophilic moiety. Therefore, a dispersant consisting of a block copolymer is more effective.

On the other hand, when a block copolymer consisting of a conventional hydrophilic monomer and a hydrophobic monomer is utilized in a dispersant, the hydrophobic moiety of a block copolymer adsorbs to pigment particles. Since the moiety contacting effectively with pigment particles is actually only a part of the overall hydrophobic moieties, even in this case the desired adsorption stability cannot be obtained.

More specifically, in the dispersant consisting of a conventional block copolymer, a sufficiently long chain of the hydrophobic moiety should be ensured for stable adsorption to the hydrophobic particles. This is because it is lacking a moiety actually participating in adsorption to the surface of hydrophobic particles, among the moieties forming a hydrophobic moiety or the degree of its interaction is weak. However, when the chain is long, a viscosity of a dispersion is increased thereby decreasing various properties of materials and dispersion stability of hydrophobic particles in an aqueous system, including an ink composition.

Accordingly, a dispersant is needed that is rapidly aligned between a surface of hydrophobic particles and an aqueous medium, is not easily desorbed, and is capable of enduring drastic polarity changes.

SUMMARY OF THE INVENTION

The present invention provides a dispersant having a substituent that has a strong adsorption to hydrophobic particles where the substituent is attached to a terminal end of a hydrophobic moiety of a copolymer. The substituent provides excellent adsorption to hydrophobic particles, such as pigment particles, and excellent long-term storage stability. The invention is also directed to an ink composition comprising the dispersant.

According to an aspect of the present invention, a dispersant is provided in which a hydrophobic substituent is attached to a terminal end of a hydrophobic moiety of a block copolymer where the block copolymer comprises both a hydrophilic moiety and a hydrophobic moiety.

According to another aspect of the present invention, an ink composition is provided comprising a dispersant in which a hydrophobic substituent is attached to a terminal end of a hydrophobic moiety of a block copolymer where the block copolymer comprises a hydrophilic moiety and a hydrophobic moiety.

The polymeric dispersant according to the present invention has excellent adsorption to hydrophobic particles. The polymeric dispersant is used to produce an ink composition having excellent storage stability and durability.

DETAILED DESCRIPTION OF THE INVENTION

The present invention will be described in more detail by describing embodiments thereof.

A dispersant according to an embodiment of the present invention is characterized in that a hydrophobic substituent capable of strongly adsorbing to the surface of hydrophobic particles is introduced into a terminal end of a hydrophobic moiety of a block copolymer where the block copolymer includes both a hydrophilic moiety and a hydrophobic moiety.

A dispersant according to an embodiment of the present invention is prepared by providing a relatively short hydrophobic moiety of a block copolymer and linking a hydrophobic substituent having a strong adsorption to hydrophobic particles to a terminal end of the hydrophobic moiety, thereby maximizing the interaction with hydrophobic particles while maintaining the portion of the hydrophobic moiety at a minimum length. Thus, excellent dispersion stability, in terms of molecular efficiency, and rapid wetting are obtained. Further, a dispersant can be easily varied and optimised to fit the requirement for a specific pigment by exchanging only a hydrophobicity-reinforcing substituent in a basic backbone copolymer.

Spatial and electrostatic stabilization provided by the hydrophilic moiety occurs due to a powerful mutual repulsion between individual dispersant/hydrophobic particle composites. Such repulsion results from hydrophilic moieties comprising ionic functional groups. Thus, individual dispersant/hydrophobic particle composites possess effectively high charges. The ionic functional groups can be cationic or anionic, but in general, have the same type of charge. The same type of charge repels each composite, thereby suppressing the aggregation of particles. The repulsion between dispersant molecules preferably provides dispersion stability for at least one year.

The hydrophilic moiety comprises a repeating unit represented by Formula I below:

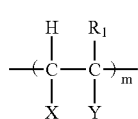

(I)

In the formula, $R_1$ is H or a $C_1$-$C_6$ alkyl group;

X is H, a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group;

Y is selected from the group consisting of —OA, —COOA, —SO$_2$A, —SO$_2$NH$_2$, —SO$_2$NHCOT$^1$, —T$^2$SO$_3$A, —SO$_3$A, —PO$_3$NH$_2$, —PO$_3$A$_2$, —NH$_2$ and —N(T$^1$)$_2$, wherein A is a hydrogen atom, an alkali metal, or N(Q$^1$)(Q$^2$)(Q$^3$)(Q$^4$) in which Q$^1$, Q$^2$, Q$^3$ or Q$^4$ each independently represents a hydrogen atom, a $C_1$-$C_{20}$ alkyl group or a $C_6$-$C_{20}$ aryl group; T$^1$ is a $C_1$-$C_{20}$ alkyl group, a $C_6$-$C_{20}$ aryl group or a $C_2$-$C_{20}$ heteroaryl group; T$_2$ is a $C_1$-$C_{20}$ alkylene group, a $C_6$-$C_{20}$ arylene group or a $C_2$-$C_{20}$ heteroarylene group; and m is an integer of 2 to 150.

The hydrophilic moiety is an electrolyte in an aqueous medium. A hydrophilic monomer constituting the hydrophilic moiety comprises, but is not limited to, at least one monomer selected from the group consisting of acrylic acid, an acrylate, metharylic acid, a methacrylate, maleic acid anhydride and sodium styrene sulfonate, and derivatives thereof. In one embodiment, the hydrophilic monomer is a methacrylate.

The hydrophobic moiety comprises a repeating unit represented by Formula II below:

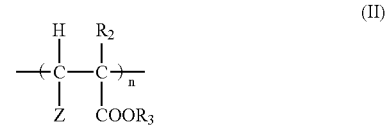

(II)

In the formula, $R_2$ is H or a $C_1$-$C_6$ alkyl group;

$R_3$ is a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group;

Z is H, a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group; and n is an integer of 2 to 150.

The hydrophobic monomer for forming the hydrophobic moiety comprises, but is not limited to, at least one monomer selected from the group consisting of methyl methacrylate, butyl metharylate, lauryl methacrylate, ethyl acrylate, butyl acrylate, acrylonitrile, methacrylonitrile, 2-ethylhexyl methacrylate, 3,3-dimethoxypropyl acrylate, 3-methacryloxypropyl acrylate, 2-acetoxyethyl methacrylate, p-tolyl methacrylate, 2,2,3,3,4,4,4-heptafluorobutyl acrylate, ethyl 2-cyanoacrylate, N,N-dimethylacrylamide, 4-fluorophenyl acrylate, 2-methacryloxyethyl acrylate, propyl vinyl ketone, ethyl 2-chloroacrylate, glycidyl methacrylate, 3-methoxypropyl methacrylate, phenyl acrylate, 2-(trimethylsiloxy)ethyl methacrylate, 2-(methylsiloxy)ethyl methacrylate, allyl acrylate and methacrylate, ethyleneglycol diacrylate, diethyleneglycol diacrylate, glycerol diacrylate, glyceryl triacrylate, ethyleneglycol dimethacrylate, and hexamethylene diol diacrylate.

A dispersant according to the present invention uses a small amount of the hydrophobic monomer to form the hydrophobic moiety in the copolymer in relation to the hydrophilic monomer, thereby improving dispersion in an aqueous medium as well as maintaining an ability to readily adsorb hydrophobic particles. Thus, a minimum amount of the hydrophobic monomer forming the hydrophobic moiety in the block copolymer can be provided to ensure the hydrophobic region that is required for the adsorption to hydrophobic particles. Accordingly, the block copolymer comprises 10% to 90% by mole of a hydrophilic monomer forming a hydrophilic moiety and 90% to 10% by mole of a hydrophobic monomer forming a hydrophobic moiety. The block copolymer can comprise 80% to 20% by mole of a hydrophobic monomer forming the hydrophobic moiety. When the amount of the hydrophobic monomer forming the hydrophobic moiety is less than 10% by mole, it is difficult to ensure a sufficient hydrophobic region that is required for adsorbing hydrophobic particles. When the amount exceeds 90% by mole, the dispersibility in an aqueous medium decreases.

A hydrophobic substituent attached to a terminal end of a hydrophobic moiety of a block copolymer according to the present invention can be at least one substituent selected from the group consisting of a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, or a substituted or unsubstituted $C_7$-$C_{20}$ arylalkyl group. Of these, an aryl group, a heteroaryl group or an arylalkyl group are preferred compared to an alkyl group, since they provide improved efficiency in contacting to hydrophobic particles.

The unsubstituted $C_1$-$C_{20}$ alkyl group includes, but is not limited to, methyl, ethyl, propyl, isobutyl, sec-butyl, pentyl, iso-amyl, hexyl, and the like, and at least one hydrogen atom of the alkyl group can be substituted with a hydroxy group, a halogen atom, a cyano, a nitro, an amino, an imino, an imidino, a hydrazine, a hydrazole, an amide group, a sulfonamide group, a carboxyl group or its salt, a phosphoric acid group or its salt, a sulfuric acid or its salt, a thiol group, a $C_1$-$C_{20}$ alkyl group, a $C_1$-$C_{20}$ alkenyl group, a $C_1$-$C_{20}$ alkynyl group, a $C_1$-$C_{20}$ alkoxy group, a $C_1$-$C_{20}$ heteroalkyl group, a $C_6$-$C_{20}$ aryl group, a $C_6$-$C_{20}$ arylalkyl group, a $C_2$-$C_{20}$ heteroaryl group, or a $C_2$-$C_{20}$ heteroarylalkyl group, and the like.

The $C_6$-$C_{20}$ aryl group includes an aromatic radical such as a phenyl, a naphthyl, and a tetrahydronaphthyl group. The aryl group can contain a substituent such as a haloalkylene, an alkyl, an aryl, a nitro, a halogen, a cyano, a hydroxy, a thiol, an amino, an imino, an amidino and an alkoxy group.

The heteroaryl group refers to a monocyclic, bicyclic or polycyclic aromatic organic compound including a 6- to 20-membered ring, which comprises at least one heteroatom selected from the group consisting of N, O, P and S, with C being the remaining ring atom. At least one hydrogen atom in the heteroatom can be substituted with the same substituents as the above-mentioned alkyl groups.

The arylalkyl group refers to the substituent in which the aryl group or the heteroaryl group as defined above is contained in a terminal end of a $C_2$-$C_{14}$ alkyl group. At least one hydrogen atom in the alkyl group, the aryl group or the heteroaryl group can be substituted with the same substituents as the above-mentioned alkyl groups.

The hydrophobic substituent can be any one substituent selected from the group consisting of phenyl, naphthyl, phenanthryl, furyl, pyridinyl, quinolidinyl, cyclohexyl, pyrolidinyl and morpholinyl.

The hydrophobic substituent can be attached in an amount of 0.05 to 90 parts by weight based on the total weight of the dispersant. When the amount is less than 0.05 parts by weight, it is difficult to obtain the effect of adsorbing particles by the hydrophobic substituent. When the amount exceeds 90 parts by weight, a solubility and a dispersibility to an aqueous medium can be decreased.

A hydrophobic substituent provides more powerful hydrophobic adsorption of the dispersant to a surface of the hydrophobic particles. In general, the degree of hydrophobic interaction with the hydrophobic particles, obtainable by the dispersant, depends on the number of functional groups in a hydrophobic substituent, such as a methylene or an aromatic group. The hydrophobic substituent and its functional group can be selected to fit the need of the specific dispersed material in which physico-chemical property of a dispersant is to be stabilized. The hydrophobic substituent adsorbs to a surface of the hydrophobic particles instead of air or a solvent through a π-π bond, an acid-base interaction, a hydrogen bond, a dipole, an ionic bond or a Van der Waals interaction, and maintains the adsorbed state despite collisions between particles.

The dispersant according to the present invention can be designed depending on a constitution of a dispersed material, and most importantly, the physical properties of a dispersed hydrophobic particle. A specific hydrophilic moiety and hydrophobic moiety, and a hydrophobic substituent can be controlled to fit an optimum hydrophilicity-hydrophobicity balance.

The dispersant can be selected according to the properties of the hydrophobic particles. For example, when hydrophobic particles have a flattened structure, a terminal group of a hydrophobic moiety is substituted with a compound having a flattened shape. A terminal group of a hydrophobic moiety is substituted with a small compound when the hydrophobic particle is small, and with a large compound when the hydrophobic particle is large. Thus, an efficiency of a dispersant adsorbing to hydrophobic particles can be accurately controlled.

Further, since the physico-chemical properties of the surfaces of each particle can be different for a dispersed identical pigment, a terminal group of a hydrophobic moiety can be substituted with at least two hydrophobic substituents, or at least two dispersants can be used at the same time, in order to maximize an efficiency of dispersion and long-term storage stability.

The number average molecular weight of a dispersant is 300,000 or less, typically 200,000 or less and preferably 150,000 or less. In one embodiment, the dispersant has a number average molecular weight of 300 to 120,000. A dispersant can be designed and synthesized such that a stable colloidal dispersed product of a hydrophobic particle/dispersant composite having a diameter less than 250 nm is ultimately formed. The diameter of the composite can be less than 200 nm, and is typically 100 to 150 nm.

The dispersant according to the present invention is prepared by preparing a block copolymer from a hydrophilic monomer, a hydrophobic monomer and an initiator, and then adding a hydrophobic compound hereto to form a hydrophobic terminal end group on a hydrophobic moiety.

The length of the hydrophilic moiety can be varied by changing the amount of the initiator reacting with the hydrophilic monomer. That is, the greater the increase in the concentration of the initiator, the shorter the length of the hydrophilic moiety. After the initiator reacts with the hydrophilic monomer component thereby completing polymerization of the hydrophilic moiety, a reactive functional group on the polymer chain reacts with the hydrophobic monomer forming a hydrophobic moiety to form the block copolymer.

A general method for polymerizing such as GTP (group transfer polymerisation), ATP (atom transfer polymerisation)

or an anionic polymerisation can be used as the method for synthesizing the block copolymer. Of these, the GTP method is applicable to various acrylic monomers, and is preferable for its efficiency since various commercially useful polymer products can be prepared through solution polymerisation under relatively mild reaction conditions.

The dispersant according to the present invention, where the terminal end group of the hydrophobic moiety of the block copolymer is substituted with a hydrophobic group, is obtained by reacting a hydrophobic compound with the block copolymer prepared according to the above noted general method for preparing the block copolymer.

Further, the present invention provides an ink composition comprising the dispersant in which the hydrophobic substituent is attached to a terminal group of the hydrophobic moiety of the block copolymer comprising a hydrophilic moiety and a hydrophobic moiety. The ink composition according to the present invention can be used in preparing an ink for an ink-jet printer and other printers.

The ink composition according to the present invention comprises a pigment, an aqueous medium, an additive having hygroscopic properties or a function for stabilizing a pigment, etc., in addition to a dispersant according to the present invention.

The pigment that can be used in the ink composition includes both an organic pigment and an inorganic pigment, and can include, but is not limited to, black, cyan, yellow, magenta, red, blue, green and white pigments. Carbon black is representative of a black pigment. The choice of carbon black suitable for the present invention depends primarily on the oxidation on the surfaces, and the degree of black color of a pigment. An acidic or surface-treated pigment provides a site for the proper interaction for powerful adsorption for a dispersant. A pigment in a high degree of black provides a high quality printed image.

A cyan pigment includes a copper phthalocyanate, a yellow pigment includes a nickel azo compound, and a magenta pigment includes a quinacridone.

The stability of the dispersed product of pigment particles can be reinforced, even at high temperatures, if the dispersant-pigment particle attraction is stronger than a pigment particle-pigment particle attraction.

Typically, pigment particles contain several molecular layers of dispersants, rather than a single dispersant molecule. This occurs when a hydrophobic substituent moiety of a dispersant adsorbs to pigment particles, which facilitates adsorption of the second dispersant molecule. This phenomenon continues until a thickness of the adsorbed dispersant layer reaches an equilibrium.

The ink composition contains the pigment particles in an amount of 0.1 to 20 parts by weight, and particularly 0.5 to 15 parts by weight, based on 100 parts by weight of the ink composition.

The aqueous medium can be water used alone or in combination with at least one organic solvent. The total amount of the organic solvent can be 2 to 50 parts by weight based on 100 parts by weight of the ink composition. The viscosity and surface tension of an ink composition can be controlled within proper ranges by the combined use of water and organic solvents as mentioned above.

The organic solvent can be at least one hydrocarbon solvent, for example, alcohols such as methyl alcohol, ethyl alcohol, n-propyl alcohol, isopropyl alcohol, n-butyl alcohol, sec-butyl alcohol, t-butyl alcohol, isobutyl alcohol, and the like; ketones such as acetone, methylethylketone, diacetone alcohol, and the like; esters such as ethyl acetate, ethyl lactate, and the like; polyhydric alcohols such as ethylene glycol, diethylene glycol, triethylene glycol, propylene glycol, butylene glycol, 1,4-butanediol, 1,2,4-butanetriol, 1,5-pentanediol, 1,2-hexanediol, 1,6-hexanediol, 1,2,6-hexanetriol, hexylene glycol, glycerol, glycerol ethoxylate, trimethylolpropane ethoxylate, and the like; lower alkyl ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether, and the like; N-containing compounds such as 2-pyrrolidone, N-methyl-2-pyrrolidone, caprolactam, and the like; dimethyl sulfoxide, tetramethylene sulfone, thioglycol, and the like.

The ink composition can further comprise additives such as viscosity controllers, moisturizing agents, surfactants and metal oxides.

The surfactants of the ink composition control the surface tension of the ink composition to stabilize the jetting performance at the nozzle. The surfactants performing such a function include anionic surfactants or nonionic surfactants The ink composition can include in a general level of 0.1 to 5.0 parts by weight of a surfactant based on 100 parts by weight of the ink composition.

The viscosity controllers control the viscosity to maintain smooth jetting. The viscosity controller is selected from the group consisting of polyvinyl alcohol, casein, and carboxymethyl cellulose. The ink composition can include 0.1 to 5.0 parts by weight of a viscosity controller based on 100 parts by weight of the ink composition.

The ink composition may further comprise acids or bases. The acids or bases increase the solubility of moisturizing agents in solvents and stabilize the pigments. The ink composition can include 0.1 to 20 parts by weight of the acids or bases based on 100 parts by weight of the ink composition.

A method of preparing the ink composition comprising the components is performed as follows.

First, a pigment is dispersed in a dispersant according to the present invention, and a viscosity controller, a surfactant, etc. are added to an aqueous medium and mixed. The mixture is then sufficiently stirred with a stirrer to form a homogeneous state. Then, the resulting product is filtered through a filter to obtain the ink composition according to the present invention. Typically, the weight ratio of pigment: dispersant is 3:2 to 3:1.

Various processing techniques can be utilized for processing a dispersed product of a pigment. One of such techniques utilizes ultrasonic energy for the mixing and deaggregation of particles. Another technique utilizes a medium mill such as a ball mill, a sand mill or a grinder. The medium mill obtains a properly dispersed product of a pigment by applying high strength micro-shearing and cascading to disrupt the aggregation of pigment particles to a dispersed product of a pigment. However, the medium mill processing system often has disadvantages including contamination of the medium mill product. Further, when a flow rate in a medium mill becomes higher than a predetermined level, the resulting milled product and dispersed product become non-uniform, and a substantial portion of materials exit the system in an insufficiently processed state.

The present invention will be described in greater detail with reference to the following examples. The following examples are for illustrative purposes and are not intended to limit the scope of the invention.

An ink composition prepared from a dispersed product of a pigment was diluted in proper concentrations, and applied to an ink-jet printer. After printing an image on general copy paper, the performance was evaluated.

Test Method

Molecular Weight of a Dispersant

The molecular weight of a dispersant was measured by eluting with gel permeation chromatography commercially available under trademark ULTRAHYDROGEL in Waters Corporation (Milford, Md., United States). The molecular weight and its distribution were measured using various molecular weights of polystyrene standard as a reference.

Storage Stability

An ink composition comprising a dispersed product of a pigment was prepared having a solid concentration of 5% to 20% by weight. The solids comprise the pigment, surfactant and any other non-volatile additives such as auxiliary dispersant. After dispersing and filtering the mixture, the resulting composition was stored in a vitreous vial and the opening of the vial was sealed. The vial was stored at 60° C. in an oven for two months, without stirring. After standing, the diameter of the dispersed product of the pigment of the composition was measured using an ultra-fine particle analyzer (trademark LA-910, Horiba Ltd.) and was evaluated according to the standard below:

○: less than 150 nm

Δ: 150~250 nm

X: exceed 250 nm

Optical Density

The average optical density was measured by using optical densitometer (TR-1224, manufactured by Macbeth) and was evaluated according to the standard below:

○: more than 1.0

Δ: 0.9~1.0

X: less than 0.9

Waterfastness

The change in optical density before and after dipping into water was measured to examine the degree that a component of an ink composition is dissolved back into water when prints were dipped into water at 1 hour after printing.

○: a rate of change in optical density is less than 10%

Δ: a rate of change in optical density is 10~30%

X: a rate of change in optical density exceeds 30%

Smearfastness

An examination for the presence of smears was done by rubbing prints 1 hour after being printed, with the finger of a technician wearing Latex examination gloves (manufactured by Fisher Scientific Co.).

○: smearing did not occur

Δ: slight smearing occurred

X: smearing occurred seriously

Jettability

An ink composition was measured to determine whether printing was achieved when the ink composition was injected into an ink cartridge container of a conventional ink-jet printer.

○: jetting was achieved well

X: printing was not achieved due to nozzle occlusion

Reliability of Printer Head

Whether coagulation occurred in a printer head was examined by using a microscope when more than 500 ml of inks were used in an ink cartridge.

○: coagulation did not occur

X: coagulation occurred

All materials used in the examples below, unless mentioned otherwise, were obtained from the Aldrich Chemical Company (Milwaukee, Wis., United States)

PREPARATION EXAMPLE

Synthesis of a Dispersant

Preparation Example 1

MMA/MAA//MMA-morpholine Block Copolymer (Dispersant A)

6 ml of THF (tetrahydrofuran) and 14.3 ml of dimethylketene methyltrimethylsilylacetal as an initiator were mixed under an argon gas atmosphere, and stirred for 30 minutes. 0.61 g of tetrabutylammonium m-chlorobenzene catalyst dissolved in 1 ml of acetonitrile was added, and the mixture was stirred for 2 hours. 29.6 ml of trimethylsilyl methacrylate and 4.7 ml of methyl methacrylate dissolved in 10 ml of THF were added in droplets. After performing the reaction for 2 hours, 9.4 ml of methyl methacrylate dissolved in 5 ml of THF was added slowly. After performing the reaction for 3 hours, 5.4 g of N-formylmorpholine were added to substitute the terminal end of the hydrophobic moiety. After stirring for 12 hours, 140 ml of methanol was added, heated to reflux for 6 hours, and then the solvent was removed under reduced pressure. The resulting solid was dried in a vacuum oven for 24 hours to obtain white MMA/MAA//MMA-morpholine block copolymer powders.

Preparation Example 2

MMA/MAA//MMA-naphthalene Block Copolymer (Dispersant B)

The dispersant B was prepared according to the same method used in Preparation Example 1, except that 10.3 g of 2-bromomethylnaphthalene were used instead of N-formylmorpholine.

Preparation Example 3

EHMA/MAA//EHMA-4-methoxyphenyl Block Copolymer (Dispersant C)

7 ml of THF and 16 ml of dimethylketene methyltrimethylsilylacetal as an initiator were mixed under an argon gas atmosphere, and stirred for 30 minutes. 0.64 g of tetrabutylammonium m-chlorobenzene catalyst dissolved in 1 ml of acetonitrile was added, and the mixture was stirred for 2 hours. 53.1 ml of trimethylsilyl methacrylate and 4.9 ml of 2-ethylhexyl methacrylate dissolved in 10 ml of THF were added in droplets. After performing the reaction for 2 hours, 9.8 ml of 2-ethylhexyl methacrylate dissolved in 5 ml of THF was added slowly. After performing the reaction for 3 hours, 7.6 g of 4-methoxybenzaldehyde were added to substitute the terminal end of the hydrophobic moiety. After stirring for 12 hours, 120 ml of methanol was added, heated to reflux for 6 hours, and then the solvent was removed under reduced pressures. The resulting solid was dried in a vacuum oven for 24 hours to obtain light yellow EHMA/MAA//EHMA-4-methoxyphenyl block copolymer powders.

Preparation Example 4

EHMA/MAA//EHMA-phenanthrene Block Copolymer (Dispersant D)

The dispersant D was prepared according to the same method used in Preparation Example 3, except that 9.6 g of phenanthrene-9-carboxaldehyde were used instead of 4-methoxybenzaldehyde.

Preparation Example 5

BMA/MAA//BMA-4-hydroxyphenyl Block Copolymer (Dispersant E)

4 ml of THF and 10.1 ml of dimethylketene methyltrimethylsilylacetal as an initiator were mixed under an argon gas atmosphere, and stirred for 30 minutes. 0.33 g of tetrabutylammonium m-chlorobenzoate catalyst dissolved in 1 ml of acetonitrile was added, and the mixture was stirred for 2 hours. 36.5 ml of trimethylsilyl methacrylate monomer and 3.5 ml of n-butyl methacrylate dissolved in 8 ml of THF were added in droplets. After performing the reaction for 2 hours, 7 ml of n-butyl methacrylate dissolved in 4 ml of THF was added slowly. After performing the reaction for 3 hours, 7.6 g of 4-acethoxybenzaldehyde were added to substitute the terminal end of the hydrophobic moiety. After stirring for 12 hours, 150 ml of methanol was added, the mixture was heated to reflux for 6 hours, and then the solvent was removed under reduced pressure. The resulting solid was dissolved completely in 200 ml of an aqueous solution of 3N NaOH, the solution was filtered with a filtering paper, and then the resulting precipitates were filtered and washed by adding an aqueous solution of HCl. The resulting solid was dried in a vacuum oven for 24 hours to obtain light yellow BMA/MAA//BMA-4-hydroxyphenyl block copolymer powders.

Preparation Example 6

EMA/MAA//EMA-furan Block Copolymer (Dispersant F)

3 ml of THF and 8.7 ml of dimethylketene methyltrimethylsilylacetal as an initiator were mixed under an argon gas atmosphere, and stirred for 30 minutes. 0.33 g of tetrabutylammonium m-chlorobenzoate catalyst dissolved in 1 ml of acetonitrile was added, and the mixture was stirred for 2 hours. 23.3 ml of trimethylsilyl methacrylate and 2.8 ml of ethyl methacrylate dissolved in 6 ml of THF were added in droplets. After performing the reaction for 2 hours, 5.6 ml of ethyl methacrylate dissolved in 3 ml of THF was added slowly. After performing the reaction for 3 hours, 4.5 g of 2-furaldehyde were added to substitute the terminal end of the hydrophobic moiety. After stirring for 12 hours, 100 ml of methanol was added, the mixture was heated to reflux for 6 hours, and then the solvent was removed under reduced pressures. The resulting solid was dried in a vacuum oven for 24 hours to obtain white EMA/MAA//EMA-furan block copolymer powders.

Preparation Example 7

EMA/MAA//EMA-pyridine Block Copolymer (Dispersant G)

The dispersant G was prepared according to the same method used in Preparation Example 6, except that 5.0 g of 2-pyridinecarboxaldehyde were used instead of 2-furaldehyde.

Preparation Example 8

LMA/MAA//LMA-cyclohexyl Block Copolymer (Dispersant H)

5 ml of THF and 13.5 ml of dimethylketene methyltrimethylsilylacetal as an initiator were mixed under an argon gas atmosphere, and stirred for 30 minutes. 0.53 g of tetrabutylammonium m-chlorobenzoate catalyst dissolved in 1 ml of acetonitrile was added, and the mixture was stirred for 2 hours. 47.3 ml of trimethylsilyl methacrylate and 3.5 ml of lauryl methacrylate dissolved in 10 ml of THF were added in droplets. After performing the reaction for 2 hours, 7 ml of lauryl methacrylate dissolved in 5 ml of THF was added slowly. After performing the reaction for 3 hours, 5.2 g of cyclohexanal were added to substitute the terminal end of the hydrophobic moiety. After stirring for 12 hours, 150 ml of methanol was added, the mixture was heated to reflux for 6 hours, and then the solvent was removed under reduced pressure. The resulting solid was dried in a vacuum oven for 24 hours to obtain white LMA/MAA//LMA-cyclohexyl block copolymer powders.

Preparation Example 9

LMA/MAA//LMA-pyrrolidine Block Copolymer (Dispersant I)

The dispersant I was prepared according to the same method used in Preparation Example 8, except that 4.6 g of N-formylpyrrolidine were used instead of cyclohexanal.

The molecular weight of a dispersant was measured by eluting with gel permeation chromatography (trademark ULTRAHYDROGEL, Waters Corporation). The molecular weight and its distribution were measured using the polystyrene standards having various molecular weights as a reference.

The molecular weight and polydispersibility index of the block copolymer powders obtained in the Preparation Examples 1 through 9 are shown in Table 1 below.

TABLE 1

| Dispersant | $M_n$ | $M_w$ | PDI |
|---|---|---|---|
| A | 2,068 | 2,502 | 1.21 |
| B | 2,658 | 3,030 | 1.14 |
| C | 2,624 | 3,201 | 1.22 |
| D | 2,739 | 3,424 | 1.25 |
| E | 2,314 | 2,730 | 1.18 |
| F | 2,566 | 3,156 | 1.23 |
| G | 2,642 | 3,329 | 1.26 |
| H | 2,206 | 2,735 | 1.24 |
| I | 2,198 | 2,791 | 1.27 |

In Table 1, $M_w$ is weight average molecular weight, $M_n$ is number average molecular weight, and PDI is polydispersibility.

An ink composition was prepared by the general method to evaluate the effects of the dispersant.

The components of each ink composition were milled in Dispermat (model name: CV) commercially available in VMA-GETMANN GmbH (Reichshof, Germany) under room temperature and pressure at high shear conditions. A motor of the Dispermat mill has a maximum speed of 20,000 rpm. A speed less than 5,000 rpm was used in milling. The resulting concentrates have a solids content of 15% to 20% by weight to prevent the formation of highly viscous pastes that are difficult to mill.

EXAMPLE 1

5.5 g of the dispersant A according to the present invention were suspended in 50 g of water, and 2.5 g of ammonia water were added to dissolve the solids. 15 g of carbon black (FW200: Degussa) pigment and 100 g of 0.3 mm zirconium bead were added, and then the mixture was milled at high speed for 2 hours. The resulting pigment dispersion was diluted with glycerine/water (10/90) mixture to obtain an ink having a solids content of about 4% by weight.

EXAMPLE 2

3.9 g of the dispersant B according to the present invention were suspended in 50 g of water, and 2.0 g of ethanolamine were added to dissolve the solids. 13 g of azomethione (Pigment yellow: BASF) pigment and 100 g of 0.3 mm zirconium bead were added, and then the mixture was milled at high speed for 2 hours. The resulting pigment dispersion was diluted with IPA/EG/water (5/7/88) mixture to obtain an ink having a solids content of about 5% by weight.

EXAMPLE 3

6.3 g of the dispersant C according to the present invention were suspended in 50 g of water, and 3.2 g of triethanolamine were added to dissolve solids. 12.5 g of Quindo Magenta (Mobay) pigment and 100 g of 0.3 mm zirconium bead were added, and then the mixture was milled at high speed for 2 hours. The resulting pigment dispersion was diluted with 1,5-pentanediol/water (12/88) mixture to obtain an ink having a solids content of about 4% by weight.

EXAMPLE 4

7.2 g of the dispersant D according to the present invention were suspended in 50 g of water, and 2.1 g of ethanolamine were added to dissolve the solids. 16 g of Heliogen blue L6901F (BASF) pigment and 100 g of 0.3 mm zirconium bead were added, and then the mixture was milled at high speed for 2 hours. The resulting pigment dispersion was diluted with IPA/water (10/90) mixture to obtain an ink having a solids content of about 4% by weight.

EXAMPLE 5

4.1 g of the dispersant E according to the present invention were suspended in 50 g of water, and 1.8 g of ammonia water were added to dissolve the solids. 13 g of carbon black (Raven 1170: Columbia Chemicals) pigment and 100 g of 0.3 mm zirconium bead were added, and then the mixture was milled at high speed for 2 hours. The resulting pigment suspension was diluted with IPA/water (15/85) mixture to obtain an ink having a solids content of about 4% by weight.

EXAMPLE 6

2.1 g of the dispersant F according to the present invention and 3.6 g of the dispersant G according to the present invention were suspended in 50 g of water, and 3.8 g of triethanolamine were added to dissolve the solids. 15 g of Chromophthal yellow 3G (Ciba-Geigy) pigment and 100 g of 0.3 mm zirconium bead were added, and then the mixture was milled at high speed for 2 hours. The resulting pigment suspension was diluted with IPA/water (10/90) mixture to obtain an ink having a solids content of about 5% by weight.

EXAMPLE 7

5.0 g of the dispersant H according to the present invention were suspended in 50 g of water, and 1.8 g of ammonia water were added to dissolve solids. 10 g of titanium dioxide (TiO$_2$ R-902: Dupont) pigment and 100 g of 0.3 mm zirconium bead were added, and then the mixture was milled at high speed for 2 hours. The resulting pigment suspension was diluted with 1,5-pentanediol/water (10/90) mixture to obtain an ink having a solids content of about 5% by weight.

EXAMPLE 8

4.5 g of the dispersant I according to the present invention was suspended in 50 g of water, and 2.2 g of ethanolamine were added to dissolve solids. 10 g of titanium dioxide (TiO$_2$ R-902: Dupont) pigment and 100 g of 0.3 mm zirconium bead were added, and then the mixture was milled at high speed for 2 hours. The resulting pigment suspension was diluted with 1,5-pentanediol/water (10/90) mixture to obtain an ink having a solids content of about 5% by weight.

Comparative Example 1

5.5 g of a dispersant poly(methyl methacrylate-co-methacrylic acid) (Mn~15,000: Aldrich) were suspended in 50 g of water, and 2.1 g of ammonia water were added to dissolve the solids. 15 g of carbon black (FW200: Degussa) pigment and 100 g of 0.3 mm zirconium bead were added, and then the mixture was milled at high speed for 2 hours. The resulting pigment dispersion was diluted with a glycerine/water (10/90) mixture to obtain an ink having a solids content of about 4% by weight.

Comparative Example 2

5.3 g of a dispersant styrene/maleic acid anhydride copolymer (Mn 1,600: Acros) were suspended in 50 g of water, and 2.8 g of triethanolamine were added to dissolve solids. 12.5 g of Quindo Magenta (Mobay) pigment and 100 g of 0.3 mm zirconium bead were added, and then the mixture was milled at high speed for 2 hours. The resulting pigment dispersion was diluted with 1,5-pentanediol/water (12/88) mixture to obtain an ink having a solids content of about 4% by weight.

Comparative Example 3

5.2 g of a dispersant poly(t-butyl acrylate-co-ethyl acrylate-co-methacrylic acid) were suspended in 50 g of water, and 1.4 g of ammonia water were added to dissolve the solids. 13 g of carbon black (Raven 1170: Columbia Chemicals) pigment and 100 g of 0.3 mm zirconium bead were added, and then the mixture was milled at high speed for 2 hours. The resulting pigment suspension was diluted with IPA/water (15/85) mixture to obtain an ink having a solids content of about 4% by weight.

The evaluation results of the properties of ink compositions prepared according to the Examples 1 through 8 and Comparative Examples 1 through 3 are shown in Table 2 below.

TABLE 2

| | Storage stability | Optical density | Water fastness | Smearfastness | Jettability | Reliability of printer head |
|---|---|---|---|---|---|---|
| Example 1 | ◯ | ◯ | ◯ | ◯ | ◯ | ◯ |
| Example 2 | ◯ | ◯ | ◯ | ◯ | ◯ | ◯ |

TABLE 2-continued

| | Storage stability | Optical density | Water fastness | Smearfastness | Jettability | Reliability of printer head |
|---|---|---|---|---|---|---|
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | Δ | ○ | ○ | Δ | Δ |
| Example 8 | ○ | ○ | ○ | ○ | ○ | ○ |
| Comp. Example 1 | Δ | X | Δ | Δ | X | X |
| Comp. Example 2 | X | Δ | Δ | Δ | Δ | Δ |
| Comp. Example 3 | Δ | Δ | Δ | Δ | Δ | X |

As can be seen in Table 2, a dispersant according to the present invention in which a hydrophobic substituent is attached to the terminal end of a hydrophobic moiety of a block copolymer has excellent storage stability, waterfastness, jettability and reliability of printer head compared with a dispersant not having a hydrophobic substituent.

The dispersant according to the present invention in which a hydrophobic substituent is attached to a terminal of a hydrophobic moiety of a block copolymer, thereby providing improved adsorbing ability, can be used in dispersing hydrophobic particles and particulates including a pigment in an aqueous system. Particularly, it can be used in dispersing a pigment suitable for an ink-jet printer.

An ink composition using a dispersant according to the present invention exhibited thermal stability, and an ink prepared by diluting the ink composition provided printed images having a superior image quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dispersant comprising a block copolymer having both a hydrophilic moiety and a hydrophobic moiety and a hydrophobic substituent attached to a terminal end of said hydrophobic moiety,
wherein said hydrophilic moiety comprises a repeating unit represented by Formula I below:

(I)

wherein,
$R_1$ is H or a $C_1$-$C_6$ alkyl group;
X is H, a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group;
Y is —OA, —COOA, —SO$_2$A, —SO$_2$NH$_2$, —SO$_2$NHCOT$^1$, —T$^2$SO$_3$A, —SO$_3$A, —PO$_3$NH$_2$, —PO$_3$A$_2$, —NH$_2$ or —N(T$^1$)$_2$, wherein A is a hydrogen atom, an alkali metal, or N(Q$^1$)(Q$^2$)(Q$^3$)(Q$^4$) in which Q$^1$, Q$^2$, Q$^3$ or Q$^4$ each independently represents a hydrogen atom, a $C_1$-$C_{20}$ alkyl group or a $C_6$-$C_{20}$ aryl group;

$T^1$ is a $C_1$-$C_{20}$ alkyl group, a $C_6$-$C_{20}$ aryl group or a $C_2$-$C_{20}$ heteroaryl group; $T_2$ is a $C_1$-$C_{20}$ alkylene group, a $C_6$-$C_{20}$ arylene group or a $C_2$-$C_{20}$ heteroarylene group; and
m is an integer of 2 to 150,
wherein said hydrophobic moiety comprises a repeating unit represented by Formula II below:

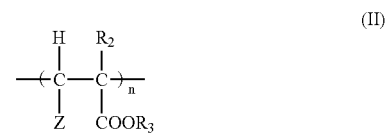

(II)

wherein
$R_2$ is H or a $C_1$-$C_6$ alkyl group;
$R_3$ is a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group;
Z is H, a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group; and
n is an integer of 2 to 150,
wherein the hydrophobic substituent is a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, or a substituted or unsubstituted $C_7$-$C_{20}$ arylalkyl group,
wherein said hydrophobic substituent is included in an amount of 0.05 to 90 parts by weight based on total weight of said dispersant.

2. The dispersant of claim 1, wherein said hydrophilic moiety comprises a repeating unit derived from at least one monomer selected from the group consisting of acrylic acid, an acrylate, maleic acid anhydride and sodium styrene sulfonate and derivatives thereof.

3. The dispersant of claim 1, wherein said hydrophobic moiety comprises a repeating unit derived from at least one monomer selected from the group consisting of methyl methacrylate, butyl methacrylate, lauryl methacrylate, ethyl acrylate, butyl acrylate, acrylonitrile, methacrylonitrile, 2-ethylhexyl methacrylate, 3,3-dimethoxypropyl acrylate, 3-methacryloxypropyl acrylate, 2-acetoxyethyl methacrylate, p-tolyl methacrylate, 2,2,3,3,4,4-heptafluorobutyl acrylate, ethyl 2-cyanoacrylate, N,N-dimethylacrylamide, 4-fluorophenyl acrylate, 2-methacryloxyethyl acrylate, propyl vinyl ketone, ethyl 2-chloroacrylate, glycidyl methacrylate, 3-methoxypropyl methacrylate, phenyl acrylate, 2-(trimethylsiloxy)ethyl methacrylate, 2-(methylsiloxy)ethyl methacrylate, allyl acrylate and methacrylate, ethyleneglycol diacrylate, diethyleneglycol diacrylate, glycerol diacrylate, glyceryl triacrylate, ethyleneglycol dimethacrylate, and hexamethylene diol diacrylate.

4. The dispersant of claim 1, wherein at least one hydrogen atom of a $C_1$-$C_{20}$ alkyl group of said hydrophobic substituent, is substituted with at least one substituent selected from the group consisting of a hydroxy group, a halogen atom, a cyano, a nitro, an amino, an imino, an imidino, a hydrazine, a hydrazole, an amide group, a sulfonamide group, a carboxyl group or its salt, a phosphoric acid group or its salt, a sulfuric acid or its salt, a thiol group, a $C_1$-$C_{20}$ alkyl group, a $C_1$-$C_{20}$ alkenyl group, a $C_1$-$C_{20}$ alkynyl group, a $C_1$-$C_{20}$ alkoxy group, a $C_1$-$C_{20}$ heteroalkyl group, a $C_6$-$C_{20}$ aryl group, a $C_6$-$C_{20}$ arylalkyl group, a $C_2$-$C_{20}$ heteroaryl group, and a $C_2$-$C_{20}$ heteroarylalkyl group.

5. The dispersant of claim 1, wherein said $C_6$-$C_{20}$ aryl group of said hydrophobic substituent includes at least one substituent selected from the group consisting of a haloalkylene, an alkyl, an aryl, a nitro, a halogen, a cyano, a hydroxy, a thiol, an amino, an imino, an amidino and an alkoxy group.

6. The dispersant of claim 1, wherein said $C_2$-$C_{20}$ heteroaryl group of said hydrophobic substituent, is a monocyclic, bicyclic or polycyclic aromatic organic compound including a 6- to 20-membered ring, which comprises at least one heteroatom selected from the group consisting of N, O, P or S, and C.

7. The dispersant of claim 1, wherein said block copolymer comprises 10 to 90% by mole of said hydrophilic moiety and 90 to 10% by mole of said hydrophobic moiety.

8. The dispersant of claim 1, wherein the number average molecular weight of the block copolymer is 300 to 120,000.

9. An ink composition comprising pigment particles, a dispersant and an aqueous medium, wherein said dispersant is of a block copolymer having both a hydrophilic moiety and a hydrophobic moiety and a hydrophobic substituent attached to a terminal end of said hydrophobic moiety,
wherein said hydrophilic moiety comprises a repeating unit represented by Formula I below:

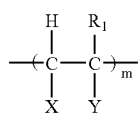

(I)

wherein,
$R_1$ is H or a $C_1$-$C_6$ alkyl group;
X is H, a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group;

Y is —OA, —COOA, —SO$_2$A, —SO$_2$NH$_2$, —SO$_2$NHCOT$^1$, —T$^2$SO$_3$A, —SO$_3$A, —PO$_3$NH$_2$, —PO$_3$A$_2$, —NH$_2$ or —N(T$^1$)$_2$, wherein A is a hydrogen atom, an alkali metal, or N(Q$^1$)(Q$^2$)(Q$^3$)(Q$^4$) in which Q$^1$, Q$^2$, Q$^3$ or Q$^4$ each independently represents a hydrogen atom, a $C_1$-$C_{20}$ alkyl group or a $C_6$-$C_{20}$ aryl group; T$^1$ is a $C_1$-$C_{20}$ alkyl group, a $C_6$-$C_{20}$ aryl group or a $C_2$-$C_{20}$ heteroaryl group; T$_2$ is a $C_1$-$C_{20}$ alkylene group, a $C_6$-$C_{20}$ arylene group or a $C_2$-$C_{20}$ heteroarylene group; and m is an integer of 2 to 150, wherein said hydrophobic moiety comprises a repeating unit represented by Formula II below:

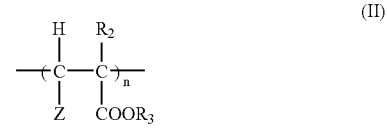

(II)

wherein
$R_2$ is H or a $C_1$-$C_6$ alkyl group;
$R_3$ is a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group;
Z is H, a substituted or unsubstituted $C_1$-$C_{20}$ alkyl group, a $C_1$-$C_{20}$ alkenyl group, a $C_1$-$C_{20}$ alkynyl group, a $C_1$-$C_{20}$ alkoxy group, a substituted or unsubstituted $C_6$-$C_{20}$ aryl group, a substituted or unsubstituted $C_2$-$C_{20}$ heteroaryl group or a substituted or unsubstituted $C_7$-$C_{20}$ arylalkyl group; and
n is an integer of 2 to 150,
wherein the hydrophobic substituent is a substituted or unsubstituted $C_1$-$C_{20}$ alkyl group, a substituted or unsubstituted $C_6$-$C_{20}$ aryl group, a substituted or unsubstituted $C_2$-$C_{20}$ heteroaryl group, or a substituted or unsubstituted $C_7$-$C_{20}$ arylalkyl group,
wherein said hydrophobic substituent is included in an amount of 0.05 to 90 parts by weight based on total weight of said dispersant.

10. The ink composition of claim 9, wherein said pigment particles and said dispersant form a particle/dispersant composite having diameters less than 250 nm.

11. The ink composition of claim 9, wherein said pigment particles are organic or inorganic pigment particles.

* * * * *